US012643783B2

(12) United States Patent
Torigoe et al.

(10) Patent No.: US 12,643,783 B2
(45) Date of Patent: Jun. 2, 2026

(54) PIPE TEMPERATURE ADJUSTING SYSTEM AND PIPE TEMPERATURE ADJUSTING METHOD

(71) Applicant: SUNTORY HOLDINGS LIMITED, Osaka (JP)

(72) Inventors: Ryota Torigoe, Osaka (JP); Hikari Suzuki, Nagaokakyo (JP); Taiga Nakagawa, Osaka (JP); Judai Kusuda, Osaka (JP)

(73) Assignee: SUNTORY HOLDINGS LIMITED, Osaka (JP)

( * ) Notice: Subject to any disclaimer, the term of this patent is extended or adjusted under 35 U.S.C. 154(b) by 0 days.

(21) Appl. No.: 17/837,397

(22) Filed: Jun. 10, 2022

(65) Prior Publication Data

US 2022/0397348 A1 Dec. 15, 2022

(30) Foreign Application Priority Data

Jun. 11, 2021 (JP) ................................ 2021-097931

(51) Int. Cl.
*B67D 1/08* (2006.01)

(52) U.S. Cl.
CPC ................................ *B67D 1/0867* (2013.01)

(58) Field of Classification Search
CPC ................................................ B67D 1/0867
See application file for complete search history.

(56) References Cited

U.S. PATENT DOCUMENTS

2006/0032869 A1* 2/2006 Younkle ............... B67D 1/1455 222/399
2006/0272348 A1* 12/2006 Kyees ...................... B67D 1/06 62/389
2010/0269707 A1 10/2010 Wiemer et al.
(Continued)

FOREIGN PATENT DOCUMENTS

EP 3090980 A1 11/2016
GB 2213246 A 8/1989
(Continued)

OTHER PUBLICATIONS

Using Hysteresis with your Temperature Controller, PanasonicElec Blog (Year: 2011).*
(Continued)

*Primary Examiner* — Eric S Ruppert
(74) *Attorney, Agent, or Firm* — WHDA, LLP

(57) ABSTRACT

A pipe temperature adjusting system includes: a liquid conducting pipe; a heat-insulating cover covering the liquid conducting pipe in such a manner as to define a cylindrical space between the heat-insulating cover and the liquid conducting pipe; a heat exchange flow path disposed in the cylindrical space and along the liquid conducting pipe and allowing a heat exchange medium to flow through the heat exchange flow path; and a pump configured to supply the heat exchange medium into the heat exchange flow path. Covering the liquid conducting pipe with the cylindrical space and causing the heat exchange medium to flow through the heat exchange flow path in the cylindrical space adjusts the internal temperature of the cylindrical space to thereby adjust the temperature of the liquid conducting pipe.

8 Claims, 2 Drawing Sheets

(56) References Cited

U.S. PATENT DOCUMENTS

| | | | | |
|---|---|---|---|---|
| 2011/0100049 | A1 | 5/2011 | Bax | |
| 2013/0276469 | A1 | 10/2013 | Dryzun | |
| 2017/0211722 | A1 * | 7/2017 | Hasegawa | F16K 27/02 |
| 2017/0233238 | A1 | 8/2017 | Bryant et al. | |

FOREIGN PATENT DOCUMENTS

| | | | | |
|---|---|---|---|---|
| GB | 2228310 | A | 8/1990 | |
| GB | 2247848 | A * | 3/1992 | B67D 1/0867 |
| GB | 2291698 | A | 1/1996 | |
| GB | 2362204 | A | 11/2001 | |
| GB | 2363191 | A * | 12/2001 | B67D 1/06 |
| GB | 2558112 | A | 7/2018 | |
| JP | S57-144900 | U | 9/1982 | |
| JP | 59-74097 | A | 4/1984 | |
| JP | H10-185323 | A | 7/1998 | |
| WO | 89/08074 | A1 | 9/1989 | |
| WO | 99/04207 | A1 | 1/1999 | |

OTHER PUBLICATIONS

Search Report dated Nov. 29, 2022, issued in counterpart United Kingdom application No. GB2208498.2. (8 pages).

Office Action dated Jan. 30, 2024, issued in counterpart JP application No. 2021-097931, with English translation. (13 pages).

* cited by examiner

PIPE TEMPERATURE ADJUSTING SYSTEM AND PIPE TEMPERATURE ADJUSTING METHOD

TECHNICAL FIELD

The present disclosure relates to a system and method for adjusting the temperature of a liquid conducting pipe configured to conduct beverage liquid from a storage tank into a filler in a beverage filling device.

BACKGROUND ART

The above beverage filling device performs a filling step to send out beverage liquid from the storage tank with use of a pump. Such beverage liquid may partially remain in the liquid conducting pipe after the pump is stopped as the filling step is complete.

Conventional practice has been to blow a fluid such as compressed air or water into the liquid conducting pipe to force the remaining beverage liquid out of the liquid conducting pipe. The beverage liquid thus forced out has purity and flavor that have been deteriorated due to the contact with the fluid. The beverage liquid is thus not used and is discarded, resulting in a loss in the filling step.

Filler devices have been known, as disclosed in Japanese Unexamined Patent Application Publication, Tokukaishou, No. S59-74097, that include a storage tank, a filler, and a circulation system therebetween. Such a filler device is capable of causing beverage liquid remaining in a liquid conducting pipe to circulate to return to a storage tank. The beverage liquid, however, has a deteriorated flavor due to contact with air during the circulation.

Common understanding has thus been that beverage liquid remaining in a liquid conducting pipe should preferably be temporarily stored therein until a subsequent filling step to avoid having a deteriorated flavor or becoming a loss.

SUMMARY

Storing beverage liquid in a liquid conducting pipe importantly involves keeping the beverage liquid at an appropriate temperature to prevent deterioration of its flavor. The outer space of the liquid conducting pipe may have an air temperature not suited to preserving beverage liquid, depending on the weather or where the liquid conducting pipe is disposed. Such a case may involve heat exchange between the liquid conducting pipe and the outer space so that the temperature of the beverage liquid in the liquid conducting pipe becomes close to the outside air temperature, with the result of the beverage liquid having a deteriorated flavor.

The above circumstances have led to a demand for a technique of appropriately managing the temperature of beverage liquid stored in a liquid conducting pipe to prevent the flavor of the beverage liquid from being deteriorated by the outside air temperature.

The present disclosure has been accomplished in view of the above issue. It is an object of the present disclosure to provide a pipe temperature adjusting system and a pipe temperature adjusting method each of which can adjust the temperature of a liquid conducting pipe to keep beverage liquid in the liquid conducting pipe at an appropriate temperature.

To attain the above object, a pipe temperature adjusting system according to the present disclosure characteristically includes:

- a heat-insulating cover covering the liquid conducting pipe in such a manner as to define a cylindrical space between the heat-insulating cover and the liquid conducting pipe;
- a heat exchange flow path disposed in the cylindrical space and along the liquid conducting pipe and allowing a heat exchange medium to flow through the heat exchange flow path; and
- a pump configured to supply the heat exchange medium into the heat exchange flow path.

The above configuration allows heat exchange between a heat exchange medium through the heat exchange flow path and the cylindrical space. This adjusts the internal temperature of the cylindrical space, and thereby adjusts the temperature of the liquid conducting pipe in the cylindrical space. The above configuration thus allows a heat exchange medium to be supplied into the heat exchange flow path to keep beverage liquid in the liquid conducting pipe at an appropriate temperature and prevent deterioration of its flavor. This in turn allows beverage liquid to be stored temporarily in the liquid conducting pipe and used afterward, thereby preventing the beverage liquid from being discarded as a loss. The above configuration also includes a heat-insulating cover to reduce heat exchange between the cylindrical space and the outer space and thereby reduce the influence of the outside air temperature on the internal temperature of the cylindrical space. This facilitates adjusting the internal temperature.

A heat exchange flow path may be in contact with a liquid conducting pipe for direct heat exchange with the liquid conducting pipe to adjust its temperature. Such a configuration will require the heat exchange flow path to be, for instance, wound around the liquid conducting pipe to have an increased contact area for uniform heat exchange. This will in turn require a long heat exchange flow path. A long heat exchange flow path will not only involve use of a heat exchange medium in an accordingly larger amount, but also increase the electric power consumption by a pump for flow of the heat exchange medium as a result of a larger pressure loss. The above configuration, in contrast, adjusts the temperature of the liquid conducting pipe through the air in the cylindrical space, and thereby allows use of a short heat exchange flow path. This in turn allows a heat exchange medium to be used in only a small amount, and also reduces the electric power consumption by the pump thanks to facilitated conduction of the heat exchange medium, with the result of a reduce load on the environment.

The pipe temperature adjusting system according to the present disclosure may preferably further include:

- a temperature sensor configured to detect an internal temperature of the cylindrical space;
- a temperature adjusting device configured to adjust a temperature of the heat exchange medium to be supplied into the heat exchange flow path; and
- a controller configured to control the temperature adjusting device and the pump so that the internal temperature detected by the temperature sensor becomes equal to a predetermined target temperature.

The heat exchange medium through the heat exchange flow path changes the internal temperature of the cylindrical space by an amount that depends mainly on the temperature and flow rate of the heat exchange medium. The above configuration adjusts the temperature and flow rate of the heat exchange medium to reduce the difference between the current internal temperature of the cylindrical space as detected by the temperature sensor and the target temperature. This allows the internal temperature of the cylindrical space to be adjusted to the target temperature.

The pipe temperature adjusting system according to the present disclosure may preferably be further arranged such that the controller controls the temperature adjusting device to adjust the temperature of the heat exchange medium to be supplied into the heat exchange flow path to a temperature at which heat is transferred between an outer space of the heat-insulating cover and the cylindrical space in an amount smaller than an amount of heat transferred between the heat exchange medium in the heat exchange flow path and the cylindrical space.

The above configuration allows heat to be transferred between the outer space of the heat-insulating cover and the cylindrical space in an amount smaller than the amount of heat transferred between the heat exchange medium in the heat exchange flow path and the cylindrical space. This means that the heat exchange medium influences the internal temperature of the cylindrical space more than the outer space does. In other words, the internal temperature of the cylindrical space becomes closer to the temperature of the heat exchange medium. The above configuration thus allows the internal temperature of the cylindrical space to be adjusted to the target temperature regardless of the outside air temperature.

The pipe temperature adjusting system according to the present disclosure may preferably further include:

a medium storage tank connected with the heat exchange flow path, wherein the pump is configured to cause the heat exchange medium to circulate between the heat exchange flow path and the medium storage tank, and the temperature adjusting device adjusts a temperature of the heat exchange medium as stored in the medium storage tank.

The above configuration allows the heat exchange medium to be circulated between the medium storage tank and the heat exchange flow path for reuse. This in turn reduces the amount of the heat exchange medium to be used, and thereby reduces the cost of the operation of the pipe temperature adjusting system, as compared to a system configured to discharge a heat exchange medium having flown through a heat exchange flow path and receive a new heat exchange medium. Further, the above configuration involves use of a medium storage tank and adjusts the temperature of a heat exchange medium in that medium storage tank. This allows the temperature of the heat exchange medium to be easily adjusted to and kept at a desired temperature.

The pipe temperature adjusting system according to the present disclosure may preferably be further arranged such that the controller controls the pump to (i) in response to the internal temperature detected by the temperature sensor falling to a predetermined lower limit temperature lower than the target temperature, stop the heat exchange medium from being supplied into the heat exchange flow path and (ii) in response to the internal temperature detected by the temperature sensor rising to a predetermined upper limit temperature higher than the lower limit temperature and not higher than the target temperature after stopping the heat exchange medium from being supplied into the heat exchange flow path, resume supplying the heat exchange medium into the heat exchange flow path.

The above configuration serves to, when the internal temperature of the cylindrical space is higher than the target temperature, supply the heat exchange flow path with a low-temperature heat exchange medium to cool the cylindrical space and decrease the internal temperature. While the supply of a low-temperature heat exchange medium could decrease the internal temperature of the cylindrical space below the target temperature, the above configuration has a lower limit temperature lower than the target temperature, and stops the supply of the heat exchange medium in response to the internal temperature detected by the temperature sensor reaching the lower limit temperature. This prevents the internal temperature from decreasing more than necessary, and reduces the operation cost.

The above configuration also has an upper limit temperature higher than the lower limit temperature and not higher than the target temperature, and resumes the supply of the heat exchange medium in response to the internal temperature detected by the temperature sensor reaching the upper limit temperature. Resuming the supply of the heat exchange medium allows the cylindrical space to be cooled again. This prevents the internal temperature from increasing above the target temperature.

The pipe temperature adjusting system according to the present disclosure may preferably be further arranged such that the heat exchange flow path includes:

a first segment allowing the heat exchange medium to flow from a first side in a longitudinal direction of the heat-insulating cover toward a second side in the longitudinal direction; and a second segment allowing the heat exchange medium to flow from the second side toward the first side.

Temperature adjustment with use of a heat exchange medium typically becomes less effective as the heat exchange medium flows through the heat exchange flow path. The heat exchange flow path for the above configuration, in contrast, allows the internal temperature of the cylindrical space to be adjusted relatively uniformly in its longitudinal direction, as compared to a heat exchange flow path having only a segment that allows a heat exchange medium to flow from a first side to a second side in the longitudinal direction of the heat-insulating cover. The above configuration thus reduces the possibility of the internal temperature of the cylindrical space becoming non-uniform in its longitudinal direction.

The pipe temperature adjusting system according to the present disclosure may preferably be further arranged such that the first and second segments are opposite to each other across the liquid conducting pipe.

With the above configuration, the first and second segments of the heat exchange flow path allow adjustment of the internal temperature on opposite sides of the liquid conducting pipe. This in turn allows the internal temperature around the liquid conducting pipe to be adjusted to the target temperature rapidly.

To attain the above object, a pipe temperature adjusting method according to the present disclosure includes:

covering a liquid conducting pipe with a cylindrical space; and causing a heat exchange medium to flow through a heat exchange flow path in the cylindrical space.

The above configuration allows heat exchange between a heat exchange medium through the heat exchange flow path and the cylindrical space. This adjusts the internal temperature of the cylindrical space, and thereby adjusts the temperature of the liquid conducting pipe in the cylindrical space. The above configuration thus allows a heat exchange medium to be supplied into the heat exchange flow path for adjustment of the internal temperature of the cylindrical space to keep beverage liquid in the liquid conducting pipe at an appropriate temperature.

DESCRIPTION OF EMBODIMENTS

The pipe temperature adjusting system according to the present disclosure serves to adjust the temperature of a liquid conducting pipe. The description below deals with how the pipe temperature adjusting system according to the present disclosure is configured, with a liquid conducting pipe for a beverage filling device as the target of temperature adjustment. The pipe temperature adjusting system according to the present disclosure is applicable to not only beverage filling devices but also any other device including a liquid conducting pipe.

Configuration of Beverage Filling Device

Figure 1:
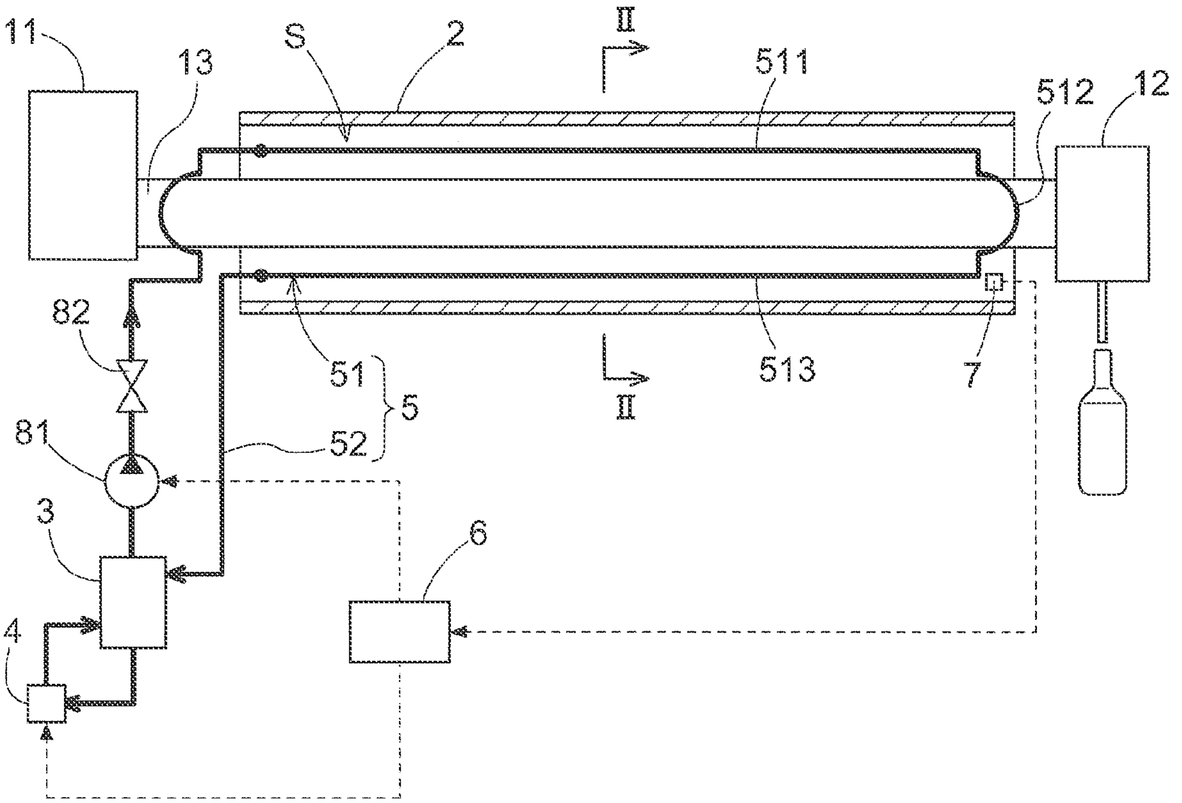
FIG. 1 is a diagram schematically illustrating the structure of a beverage filling device equipped with a pipe temperature adjusting system according to the present disclosure.

FIG. 1 is a diagram schematically illustrating the structure of a beverage filling device equipped with a pipe temperature adjusting system according to an embodiment of the present disclosure. As illustrated in FIG. 1, the beverage filling device includes a beverage storage tank 11, a filler 12, and a liquid conducting pipe 13. The beverage storage tank 11 is configured to store beverage liquid produced through a preceding process. The filler 12 is configured to fill a container with beverage liquid. The liquid conducting pipe 13 connects the beverage storage tank 11 with the filler 12 to conduct beverage liquid from inside the beverage storage tank 11 into the filler 12. The liquid conducting pipe 13 is provided with devices (not illustrated in the drawings) such as a pump configured to suck beverage liquid from the beverage storage tank 11, a valve configured to adjust the flow rate of beverage liquid, and a flow rate sensor configured to detect the flow rate of beverage liquid. The liquid conducting pipe 13 serves also to temporarily store beverage liquid from the beverage storage tank 11.

Configuration of Pipe Temperature Adjusting System

As illustrated in FIG. 1, the pipe temperature adjusting system includes a heat-insulating cover 2, a medium storage tank 3, a temperature adjusting device 4, a medium flow path 5, and a controller 6.

Figure 2:
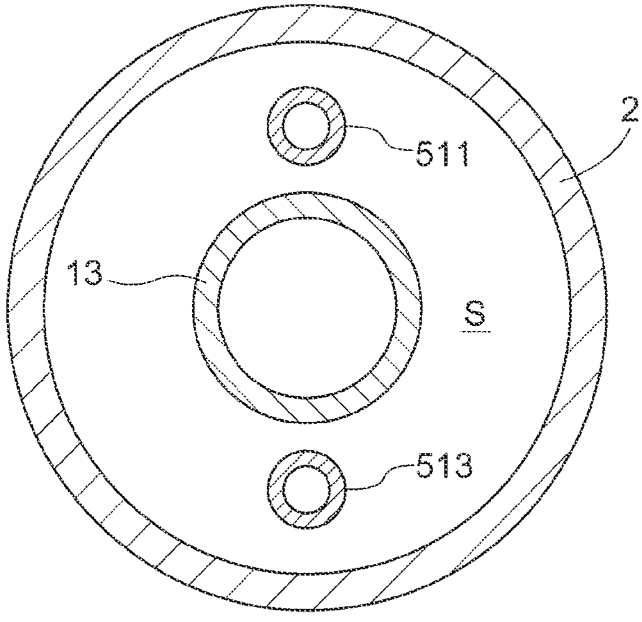
FIG. 2 is a cross-sectional view taken along line II-II in FIG. 1.

As illustrated in FIG. 2, the heat-insulating cover 2 is in the shape of a cylinder with a hollow portion. The heat-insulating cover 2 covers the liquid conducting pipe 13 of the beverage filling device such that the liquid conducting pipe 13 extends substantially on the central axis of the hollow portion. This defines a substantially cylindrical space S between the heat-insulating cover 2 and the liquid conducting pipe 13. The heat-insulating cover 2 includes a heat-insulating material that reduces heat exchange between the cylindrical space S and the outer space of the heat-insulating cover 2. Non-limiting examples of the heat-insulating material include foamed materials such as urethane foam, polystyrene foam, and polyethylene foam. The heat-insulating cover 2 for the present embodiment is a combination of two semi-cylindrical members as an example, but may alternatively be a combination of more than two members.

The heat-insulating cover 2 is illustrated in FIG. 1 as having open ends at opposite sides in the longitudinal direction for convenience of illustration. The heat-insulating cover 2, in actuality, has closed ends at the opposite sides with members integral with the heat-insulating cover 2 or separate members attached to the respective ends of the heat-insulating cover 2. This prevents air from entering and exiting the cylindrical space S. The pipe temperature adjusting system includes in the cylindrical space S a temperature sensor 7 configured to detect the internal temperature of the cylindrical space S. The pipe temperature adjusting system as the present embodiment includes a single temperature sensor 7 on that end portion of the heat-insulating cover 2 which faces the filler 12. The pipe temperature adjusting system is, however, not necessarily configured as such. The pipe temperature adjusting system may include a temperature sensor 7 at any position inside the heat-insulating cover 2 such as on that end portion of the heat-insulating cover 2 which faces the beverage storage tank 11. The pipe temperature adjusting system may also include two or more temperature sensors 7.

The medium storage tank 3 stores a heat exchange medium for heat exchange with the cylindrical space S. The heat exchange medium is not limited to any particular kind, and may be selected in accordance with conditions for target temperature adjustment. Examples of the heat exchange medium include liquid mediums such as water, oil, and chlorofluorocarbon coolants and gas mediums such as air and carbon dioxide. The medium storage tank 3 is connected with the temperature adjusting device 4. The temperature adjusting device 4 receives, from a temperature sensor (not illustrated in the drawings) on the medium storage tank 3, a signal indicative of the current temperature of the heat exchange medium in the medium storage tank 3 and, from the controller 6, a signal indicative of the target temperature for the heat exchange medium (that is, the later-described "required temperature"). The temperature adjusting device 4 adjusts the temperature of the heat exchange medium in the medium storage tank 3 on the basis of the above signals. Non-limiting examples of the temperature adjusting device 4 include a refrigerator and a heater.

The medium flow path 5 allows the heat exchange medium to flow therethrough, and includes a heat exchange flow path 51 and a circulation flow path 52. The heat exchange flow path 51 is disposed in the cylindrical space S and along the liquid conducting pipe 13. The heat exchange flow path 51 includes a first segment 511, a second segment 513, and a third segment 512. The first segment 511 allows the heat exchange medium to flow from a first side in the longitudinal direction of the heat-insulating cover 2 toward a second side in the longitudinal direction. The second segment 513 allows the heat exchange medium to flow oppositely from the second side toward the first side. The third segment 512 is a turnaround segment connecting the first segment 511 with the second segment 513. These three segments allow a single round flow of the heat exchange medium between the first and second sides. The first segment 511 and the second segment 513 are opposite to each other across the liquid conducting pipe 13. The heat exchange flow path 51 is in the form of a pipe made of a material with high thermal conductivity such as stainless steel, copper, or aluminum for efficient heat exchange between the heat exchange medium in the heat exchange flow path 51 and the cylindrical space S.

The heat exchange flow path 51 for the present embodiment is in no contact with the heat-insulating cover 2 or the liquid conducting pipe 13. The heat exchange flow path 51 may alternatively be at least partially in contact with either or both of the heat-insulating cover 2 and the liquid conducting pipe 13. The heat exchange flow path 51 for the present embodiment is directed to allow the heat exchange medium to flow with a start point and an end point at that end portion of the heat-insulating cover 2 which faces the beverage storage tank 11. The heat exchange flow path 51 may alternatively be directed to allow the heat exchange medium to flow with a start point and an end point at that end portion of the heat-insulating cover 2 which faces the filler 12.

The circulation flow path 52 connects the medium storage tank 3 with the heat exchange flow path 51 in such a manner as to form a closed circuit for circulation of the heat exchange medium. The circulation flow path 52 is provided with, for example, a pump 81 as a power source for circulation of the heat exchange medium, a flow rate valve 82, and a flow rate sensor (not illustrated in the drawings).

The controller 6 is connected with the temperature sensor 7 to receive a signal indicative of the result of the detection by the temperature sensor 7. The controller 6 is also connected with the temperature adjusting device 4 and the pump 81 to transmit control signals thereto. If some beverage liquid is stored temporarily in the liquid conducting pipe 13, the controller 6 controls the adjustment of the internal temperature of the cylindrical space S, which covers the liquid conducting pipe 13, to keep the beverage liquid in the liquid conducting pipe 13 at an appropriate temperature.

The description below deals with how the controller 6 controls the temperature adjustment in an example case where the outside air temperature is higher than the appropriate temperature for beverage liquid.

Controlling Temperature of Heat Exchange Medium

In the above case, the heat exchange medium is a cooling medium for cooling the cylindrical space S, for example cold water, and the temperature adjusting device 4 is, for example, a refrigerator. The temperature adjusting device 4 adjusts the temperature of cold water in the medium storage tank 3 to a predetermined required temperature under control of the controller 6. The required temperature refers to the temperature of cold water that, when flowing through the heat exchange flow path 51, adjusts the internal temperature of the cylindrical space S to a predetermined temperature (hereinafter referred to as "target temperature") not higher than the appropriate temperature for beverage liquid to keep beverage liquid in the liquid conducting pipe 13 at the appropriate temperature. The required temperature for the cooling medium is calculated based on the mathematical expressions below.

$$Q_1 = \frac{\pi(\theta_r - T_1)}{\frac{1}{\alpha OD_1} + \frac{1}{2\lambda_1} \times \ln\frac{OD_1}{ID_1}} \times m_1 \quad \text{[Math. 1]}$$

Mathematical Expression 1 serves to determine the amount of heat transferred from the outer space to the cylindrical space S, where $\theta_r$ is the outside air temperature (° C.), $T_1$ is the target temperature (° C.), $\alpha$ is the heat transfer rate (W/m$^2$K) at the surface, $OD_1$ is the outer diameter (m) of the heat-insulating cover 2, $ID_1$ is the inner diameter (m) of the heat-insulating cover 2, $\lambda_1$ is the thermal conductivity (W/m·K) of the heat-insulating cover 2, ln indicates the natural logarithm of the value that follows it, and $m_1$ is the longitudinal dimension (m) of the heat-insulating cover 2.

$$Q_2 = \frac{\pi(T_1 - T_2)}{\frac{1}{\alpha OD_2} + \frac{1}{2\lambda_2} \times \ln\frac{OD_2}{ID_2}} \times m_2 \quad \text{[Math. 2]}$$

Mathematical Expression 2 serves to determine the amount of heat transferred from the cylindrical space S into the heat exchange flow path 51, where $T_1$ is the target temperature (° C.), $T_2$ is the required temperature (° C.), $\alpha$ is the heat transfer rate (W/m$^2$K) at the surface, $OD_2$ is the outer diameter (m) of the heat exchange flow path 51, $ID_2$ is the inner diameter (m) of the heat exchange flow path 51, $\lambda_2$ is the thermal conductivity (W/m·K) of the heat exchange flow path 51, ln indicates the natural logarithm of the value that follows it, and $m_2$ is the length (m) of the heat exchange flow path 51.

The required temperature $T_2$ is such that $Q_1 < Q_2$.

Continuing to supply the heat exchange flow path 51 with cold water having a temperature not higher than the required temperature causes heat exchange between the outer space of the heat-insulating cover 2 and the cylindrical space S and between the heat exchange flow path 51 and the cylindrical space S. Since the amount $Q_1$ of heat transferred between the outer space and the cylindrical space S is smaller than the amount $Q_2$ of heat transferred between the heat exchange flow path 51 and the cylindrical space S, the internal temperature of the cylindrical space S decreases over time to eventually reach the target temperature.

Cold water through the heat exchange flow path 51 does not have a constant temperature; it increases with heat exchange between the cylindrical space S and the heat exchange flow path 51. Thus, cold water to be supplied into the heat exchange flow path 51, in actuality, needs to have a temperature lower by an extent equivalent to or greater than the temperature increase during the flow through the heat exchange flow path 51.

Controlling Flow Rate of Heat Exchange Medium

Cold water may be supplied into the heat exchange flow path 51 continuously. In this case, the pump 81 adjusts the flow rate of cold water under control of the controller 6 so that the temperature of the cold water does not exceed the required temperature while the cold water flows through the heat exchange flow path 51. The present embodiment may be configured such that the temperature of cold water is detected by a temperature sensor (not illustrated in the drawings) on the heat exchange flow path 51 and that the temperature sensor transmits to the controller 6 a signal indicative of the temperature.

Figure 3:
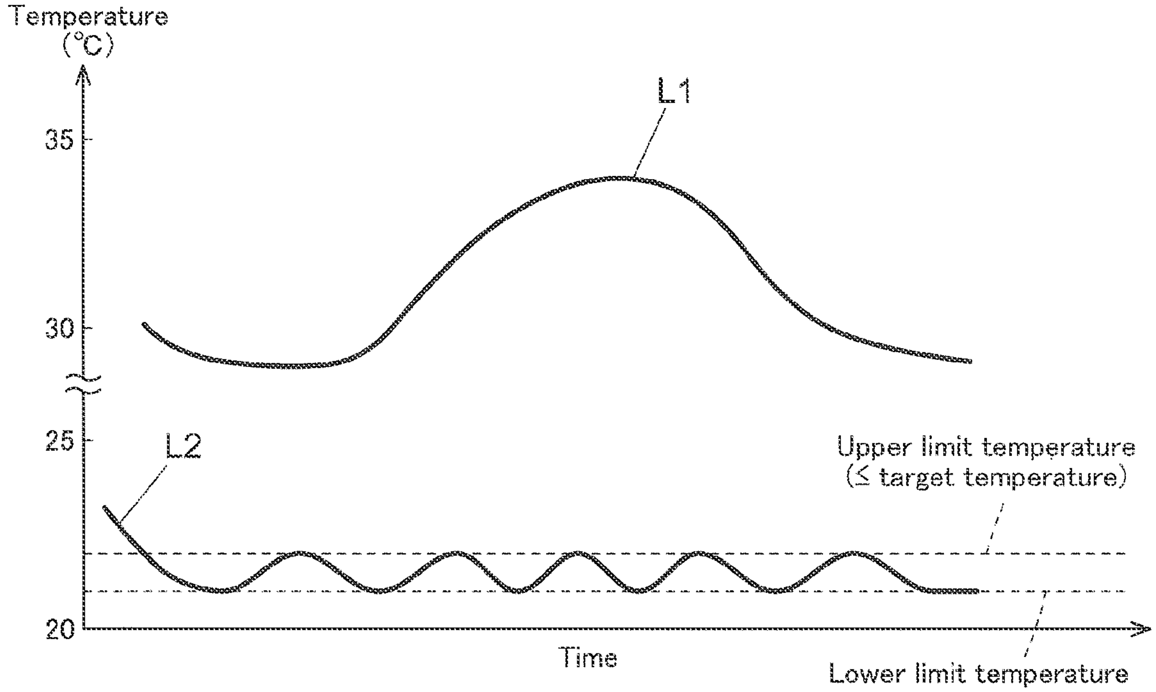
FIG. 3 is a graph illustrating an example change in an outside air temperature and in an internal temperature.

Cold water may also be supplied into the heat exchange flow path 51 in a pulsated manner. FIG. 3 is a graph illustrating an example change in the outside air temperature, indicated with line L1, and in the internal temperature, indicated with line L2. The outside air temperature may be not constant and change over time as shown with line L1 in FIG. 3 as an example, depending on where the liquid conducting pipe 13 is disposed. Adjusting the temperature of the cold water in accordance with a change in the outside air temperature will increase the load on the system. Thus, in the above case, it is preferable to assign to the outside air temperature Or in Mathematical Expression 1 a temperature not lower than the highest expectable temperature for calculation of a required temperature and to adjust the temperature of the cold water to that required temperature.

Continuously supplying the heat exchange flow path 51 with cold water having the required temperature calculated as above will decrease the internal temperature of the cylindrical space S below the target temperature, leading to an unnecessarily high operation cost. In view of that, cold water may be supplied into the heat exchange flow path 51 in a pulsated manner to prevent the internal temperature from decreasing more than necessary.

FIG. 3 shows line L2 as a specific example. The internal temperature of the cylindrical space S as detected by the temperature sensor 7 decreases with the supply of cold water. The controller 6 thus controls the pump 81 as follows: The pump 81 stops supplying cold water into the heat exchange flow path 51 in response to the internal temperature falling to a predetermined lower limit temperature lower than the target temperature. The pump 81 then resumes supplying cold water into the heat exchange flow path 51 in response to the internal temperature of the cylindrical space S as detected by the temperature sensor 7 rising to a predetermined upper limit temperature higher than the lower limit temperature and not higher than the target temperature after stopping supplying cold water. Controlling the internal temperature as described above so that it is mostly between the upper and lower limit temperatures not only keeps the internal temperature at not higher than the target temperature, but also prevents the internal temperature from decreasing more than necessary. The controller 6 may alternatively control the flow rate valve 82 instead of or in addition to the pump 81.

EXAMPLES

The description below deals with an example of how the temperature of a liquid conducting pipe 13 was adjusted in accordance with the present disclosure which liquid conducting pipe 13 was disposed outdoors where the air temperature changed as shown with line L1 in FIG. 3. The pipe temperature adjusting method according to the present disclosure is, however, not limited the Example below.

This Example set the target temperature for the internal temperature of the cylindrical space S at 23° C., which was lower than the appropriate temperature for beverage liquid remaining in the liquid conducting pipe 13. The Example also set the outside air temperature at 40° C., which was higher than the highest expectable air temperature. The Example used the liquid conducting pipe 13, the heat-insulating cover 2, and the heat exchange flow path 51 detailed below.

Liquid Conducting Pipe
- Inner diameter: 54.9 mm
- Outer diameter: 60.5 mm
- Material: stainless steel 304

Heat-Insulating Cover
- Inner diameter: 114.3 mm
- Outer diameter: 164.3 mm
- Longitudinal dimension: 300 m
- Material: urethane foam
- Thermal conductivity: 0.022 W/m·K
- Heat transfer rate at the surface: 7 $W/m^2 \cdot K$ Heat Exchange Flow Path
- Inner diameter: 16.1 mm
- Outer diameter: 21.7 mm
- Length: 600 m
- Material: stainless steel 304
- Thermal conductivity: 16.7 W/m·K
- Heat transfer rate at the surface: 7 $W/m^2 \cdot K$
- Heat exchange medium: cold water Mathematical Expression 1 above gave 1757.49 W (1513.63 Kcal/h) as the amount $Q_1$ of heat transferred from the outer space to the cylindrical space S in the heat-insulating cover 2. Mathematical Expression 2 above gave $285.937 \times (23 - T_2)$ as the amount $Q_2$ of heat transferred from the cylindrical space S into the heat exchange flow path 51. The required temperature $T_2$, for which $Q_1 < Q_2$, was lower than approximately 16.85° C.

Cold water in the medium storage tank 3 was adjusted to the required temperature $T_2$ with use of the temperature adjusting device 4 in the form of a refrigerator. The cold water, adjusted to the required temperature $T_2$, was supplied by the pump 81 into the heat exchange flow path 51 at a flow rate of 100 L/h to 300 L/h. In response to the internal temperature falling to 21° C. due to the supply of the cold water, the supply of the cold water with use of the pump 81 was stopped. Then, in response to the internal temperature of the cylindrical space S rising back to 22° C. after the supply of the cold water was stopped, the supply of the cold water with use of the pump 81 was resumed. This operation kept the internal temperature of the cylindrical space S between 21° C. (lower limit temperature) and 22° C. (upper limit temperature).

ALTERNATIVE EMBODIMENTS (1) The embodiment described above is configured to control the temperature and flow rate of a heat exchange medium to decrease the internal temperature of the cylindrical space S. The embodiment may, however, be altered to control the temperature and flow rate of a heat exchange medium to increase the internal temperature of the cylindrical space S. The pipe temperature adjusting method according to the present disclosure is thus applicable also to the case of adjusting the temperature of a liquid conducting pipe to a temperature higher than the outside air temperature.

(2) The embodiment described above is configured such that the heat exchange flow path allows a single round flow of a heat exchange medium between a first side and second side in the longitudinal direction of the heat-insulating cover. The heat exchange flow path may, however, alternatively extend merely from the first side to the second side without a turnaround point, in other words, include only a segment that allows a heat exchange medium to flow from the first side to the second side. The heat exchange flow path may further alternatively allow two or more round flows of a heat exchange medium between the first and second sides.

(3) The embodiment described above includes a single heat exchange flow path in the heat-insulating cover. The embodiment may, however, be altered to include two or more heat exchange flow paths unconnected with each other in the heat-insulating cover. The heat exchange flow paths in this case may allow a heat exchange medium to flow in respective directions identical to or different from each other.

(4) The embodiment described above includes a system for circulation of the heat exchange medium between the heat exchange flow path and the medium storage tank. The embodiment may, however, be altered so that the heat exchange medium having passed through the heat-insulating cover is not circulated and instead discharged.

(5) The embodiment described above is configured to adjust the temperature of a liquid conducting pipe in which beverage liquid remains. The embodiment may, however, be altered to adjust the temperature of a liquid conducting pipe through which beverage liquid is flowing. The pipe temperature adjusting method according to the present disclosure is applicable to adjustment of the temperature of not only a pipe for liquid but also a pipe for gas or solid.

The invention claimed is:

1. A pipe temperature adjusting system for adjusting a temperature of a liquid conducting pipe, the pipe temperature adjusting system comprising:

a heat-insulating cover covering the liquid conducting pipe in such a manner as to define a cylindrical space between the heat-insulating cover and the liquid conducting pipe;

a heat exchange flow path disposed in the cylindrical space and along the liquid conducting pipe in no contact with the liquid conducting pipe, and allowing a heat exchange medium to flow through the heat exchange flow path;

a pump configured to supply the heat exchange medium into the heat exchange flow path;

a temperature sensor configured to detect an internal temperature of the cylindrical space;

a temperature adjuster configured to adjust a temperature of the heat exchange medium to be supplied into the heat exchange flow path; and a controller configured to control the temperature adjuster and the pump so that the internal temperature detected by the temperature sensor becomes equal to a predetermined target temperature, wherein the controller controls the temperature adjuster to adjust the temperature of the heat exchange medium to be supplied into the heat exchange flow path to a temperature at which heat is transferred between an outer space of the heat-insulating cover and the cylindrical space in an amount smaller than an amount of heat transferred between the heat exchange medium in the heat exchange flow path and the cylindrical space, and the controller controls the temperature adjuster to adjust the temperature of the heat exchange medium to satisfy following relationships and a required temperature $T_2$ of the heat exchange medium:

$Q_1$ is an amount of heat transferred from the outer space to the cylindrical space, $Q_2$ amount of heat transferred from the cylindrical space into the heat exchange medium in the heat exchange flow path, $$Q_1 = \frac{\pi(\theta_r - T_1)}{\frac{1}{\alpha OD_1} + \frac{1}{2\lambda_1} \times \ln\frac{OD_1}{ID_1}} \times m_1$$

where $\theta_r$ is the outside air temperature (° C.), $T_1$ is the target temperature of the internal temperature of the cylindrical space (° C.), $\alpha$ is the heat transfer rate ($W/m^2 \cdot K$) at the surface, $OD_1$ is the outer diameter (m) of the heat-insulating cover, $ID_1$ is the inner diameter (m) of the heat-insulating cover, $\lambda_1$ is the thermal conductivity ($W/m \cdot K$) of the heat-insulating cover, ln indicates the natural logarithm of the value that follows it, and $m_1$ is the longitudinal dimension (m) of the heat-insulating cover, $$Q_2 = \frac{\pi(T_1 - T_2)}{\frac{1}{\alpha OD_2} + \frac{1}{2\lambda_2} \times \ln\frac{OD_2}{ID_2}} \times m_2$$

where $T_1$ is the target temperature of the internal temperature of the cylindrical space (° C.), $T_2$ is the required temperature of the heat exchange medium (° C.), $\alpha$ is the heat transfer rate ($W/m^2 \cdot K$) at the surface, $OD_2$ is the outer diameter (m) of the heat exchange flow path, $ID_2$ is the inner diameter (m) of the heat exchange flow path, $\lambda_2$ is the thermal conductivity ($W/m \cdot K$) of the heat exchange flow path, ln indicates the natural logarithm of the value that follows it, and $m_2$ is the length (m) of the heat exchange flow path, wherein the required temperature $T_2$ is such that $Q_1 < Q_2$.

2. The pipe temperature adjusting system according to claim 1, further comprising:

a medium storage tank connected with the heat exchange flow path, wherein the pump is configured to cause the heat exchange medium to circulate between the heat exchange flow path and the medium storage tank, and the temperature adjuster adjusts a temperature of the heat exchange medium as stored in the medium storage tank.

3. The pipe temperature adjusting system according to claim 1, wherein the controller controls the pump to (i) in response to the internal temperature detected by the temperature sensor falling to a predetermined lower limit temperature lower than the target temperature, stop the heat exchange medium from being supplied into the heat exchange flow path and (ii) in response to the internal temperature detected by the temperature sensor rising to a predetermined upper limit temperature higher than the lower limit temperature and not higher than the target temperature after stopping the heat exchange medium from being supplied into the heat exchange flow path, resume supplying the heat exchange medium into the heat exchange flow path.

4. The pipe temperature adjusting system according to claim 1, wherein the heat exchange flow path includes:

a first segment allowing the heat exchange medium to flow from a first side in a longitudinal direction of the heat-insulating cover toward a second side in the longitudinal direction; and a second segment allowing the heat exchange medium to flow from the second side toward the first side.

5. The pipe temperature adjusting system according to claim 4, wherein the first and second segments are opposite to each other across the liquid conducting pipe.

6. The pipe temperature adjusting system according to claim 1, wherein when controlling the temperature adjuster, an amount of heat transferred between the outer space of the heat-insulating cover and the cylindrical space is calculated based on an outside air temperature set at a temperature not lower than a highest expectable temperature.

7. A pipe temperature adjusting method, comprising:

covering a liquid conducting pipe with a heat-insulating cover to define a cylindrical space between the heat-insulating cover and the liquid conducting pipe;

providing a heat exchange flow path in the cylindrical space and along the liquid conducting pipe in no contact with the liquid conducting pipe;

causing a heat exchange medium to flow through the heat exchange flow path in the cylindrical space;

detecting an internal temperature of the cylindrical space; and adjusting a temperature and flow rate of the heat exchange medium to be supplied into the heat exchange flow path so that the detected internal temperature becomes equal to a predetermined target temperature, wherein the temperature of the heat exchange medium to be supplied into the heat exchange flow path is adjusted to a temperature at which heat is transferred between an outer space of the heat-insulating cover and the cylindrical space in an amount smaller than an amount of heat transferred between the heat exchange medium in the heat exchange flow path and the cylindrical space, and the temperature of the heat exchange medium to be supplied into the heat exchange flow path is adjusted to satisfy following relationships and a required temperature $T_2$ of the heat exchange medium:

$Q_1$ is an amount of heat transferred from the outer space to the cylindrical space, $Q_2$ amount of heat transferred from the cylindrical space into the heat exchange medium in the heat exchange flow path, $$Q_1 = \frac{\pi(\theta_r - T_1)}{\frac{1}{\alpha OD_1} + \frac{1}{2\lambda_1} \times \ln\frac{OD_1}{ID_1}} \times m_1$$

where $\theta_r$ is the outside air temperature (° C.), $T_1$ is the target temperature of the internal temperature of the cylindrical space (° C.), $\alpha$ is the heat transfer rate ($W/m^2 \cdot K$) at the surface, $OD_1$ is the outer diameter (m) of the heat-insulating cover, $ID_1$ is the inner diameter (m) of the heat-insulating cover, $\lambda_1$ is the thermal conductivity (W/m·K) of the heat-insulating cover, ln indicates the natural logarithm of the value that follows it, and $m_1$ is the longitudinal dimension (m) of the heat-insulating cover, $$Q_2 = \frac{\pi(T_1 - T_2)}{\frac{1}{\alpha OD_2} + \frac{1}{2\lambda_2} \times \ln\frac{OD_2}{ID_2}} \times m_2$$

where $T_1$ is the target temperature of the internal temperature of the cylindrical space (° C.), $T_2$ is the required temperature of the heat exchange medium (° C.), $\alpha$ is the heat transfer rate ($W/m^2 \cdot K$) at the surface, $OD_2$ is the outer diameter (m) of the heat exchange flow path, $ID_2$ is the inner diameter (m) of the heat exchange flow path, $\lambda_2$ is the thermal conductivity (W/m·K) of the heat exchange flow path, ln indicates the natural logarithm of the value that follows it, and $m_2$ is the length (m) of the heat exchange flow path, wherein the required temperature $T_2$ is such that $Q_1 < Q_2$.

8. The pipe temperature adjusting method according to claim 7, wherein an amount of heat transferred between the outer space of the heat-insulating cover and the cylindrical space is calculated based on an outside air temperature set at a temperature not lower than a highest expectable temperature.

* * * * *